(12) United States Patent
Tachibana et al.

(10) Patent No.: US 9,385,439 B2
(45) Date of Patent: Jul. 5, 2016

(54) METAL MEMBER, A TERMINAL, A WIRE CONNECTING STRUCTURE AND A METHOD OF MANUFACTURING A TERMINAL

(71) Applicants: Furukawa Electric Co., Ltd., Tokyo (JP); Furukawa Automotive Systems Inc., Shiga (JP)

(72) Inventors: Akira Tachibana, Tokyo (JP); Kengo Mitose, Tokyo (JP); Chikanobu Ikuta, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 14/829,317

(22) Filed: Aug. 18, 2015

(65) Prior Publication Data
US 2015/0357723 A1 Dec. 10, 2015

Related U.S. Application Data

(63) Continuation of application No. PCT/JP2014/050171, filed on Jan. 8, 2014.

(30) Foreign Application Priority Data

Feb. 24, 2013 (JP) .................................. 2013-034072

(51) Int. Cl.
*H01R 9/24* (2006.01)
*H01R 4/10* (2006.01)
(Continued)

(52) U.S. Cl.
CPC ................ *H01R 4/187* (2013.01); *B23K 26/32* (2013.01); *B23K 26/322* (2013.01); *B32B 15/04* (2013.01);
(Continued)

(58) Field of Classification Search
CPC ............ H01R 4/185; H01R 4/20; H01R 4/62; H01R 4/2495; H01R 13/03; Y10T 428/12493; Y10T 428/31678; Y10T 428/12903; Y10T 428/12028; Y10T 428/12722
USPC ...... 439/886–887, 877–878; 174/74 R, 84 C; 428/615, 646–648; 29/861
See application file for complete search history.

(56) References Cited

U.S. PATENT DOCUMENTS

| | | | | |
|---|---|---|---|---|
| 5,129,143 | A | * | 7/1992 | Wei .......................... C25D 5/10 29/885 |
| 5,307,562 | A | * | 5/1994 | Denlinger .............. H01R 13/03 29/882 |

(Continued)

FOREIGN PATENT DOCUMENTS

| | | |
|---|---|---|
| JP | S60-180686 A | 9/1985 |
| JP | H08-218137 A | 8/1996 |

(Continued)

OTHER PUBLICATIONS

English translation of Written Opinion for PCT/JP2014/050171 dated Apr. 1, 2014.

(Continued)

*Primary Examiner* — Xuong Chung Trans
(74) *Attorney, Agent, or Firm* — Thompson Coburn LLP

(57) ABSTRACT

A metal member includes a base material composed of one of copper and a copper alloy, a white metal layer provided on the base material at a part or an entirety thereof, and an oil film provided on the white metal layer. The white metal layer has a thickness of 0.01 μm to 0.80 μm. A surface of the white metal layer has an arithmetic mean roughness of 0.6 μm to 1.2 μm. The oil film has an electric double-layer capacitance of 1.5 μF/cm² to 7.0 μF/cm².

14 Claims, 6 Drawing Sheets

(51) Int. Cl.

| | | |
|---|---|---|
| *H01R 4/18* | (2006.01) | |
| *B32B 15/04* | (2006.01) | |
| *B32B 15/20* | (2006.01) | |
| *C25D 7/00* | (2006.01) | |
| *C22C 9/06* | (2006.01) | |
| *H01R 13/03* | (2006.01) | |
| *H01R 43/02* | (2006.01) | |
| *H01R 43/16* | (2006.01) | |
| *C25D 5/48* | (2006.01) | |
| *B23K 26/32* | (2014.01) | |
| *H01R 4/20* | (2006.01) | |
| *H01R 4/62* | (2006.01) | |
| *C25D 3/12* | (2006.01) | |
| *C25D 3/30* | (2006.01) | |
| *C25D 5/16* | (2006.01) | |

(52) U.S. Cl.
CPC .............. *B32B 15/043* (2013.01); *B32B 15/20* (2013.01); *C22C 9/06* (2013.01); *C25D 5/48* (2013.01); *C25D 7/00* (2013.01); *H01R 13/03* (2013.01); *H01R 43/0221* (2013.01); *H01R 43/16* (2013.01); *B23K 2201/34* (2013.01); *B23K 2201/38* (2013.01); *B23K 2203/08* (2013.01); *B23K 2203/12* (2013.01); *B32B 2250/03* (2013.01); *B32B 2307/20* (2013.01); *C25D 3/12* (2013.01); *C25D 3/30* (2013.01); *C25D 5/16* (2013.01); *H01R 4/20* (2013.01); *H01R 4/62* (2013.01); *Y10T 29/49215* (2015.01); *Y10T 428/12472* (2015.01)

(56) References Cited

U.S. PATENT DOCUMENTS

| | | | | |
|---|---|---|---|---|
| 6,770,383 | B2 * | 8/2004 | Tanaka | B32B 15/01 427/123 |
| 7,294,028 | B2 * | 11/2007 | Rehbein | H01H 1/02 428/614 |
| 8,342,895 | B2 * | 1/2013 | Yoshida | C25D 5/10 439/886 |
| 8,403,714 | B2 * | 3/2013 | Nakata | H01R 13/03 439/877 |
| 8,496,504 | B2 * | 7/2013 | Ono | H01R 4/185 439/877 |

FOREIGN PATENT DOCUMENTS

| | | |
|---|---|---|
| JP | H10-334962 A | 12/1998 |
| JP | H11-144774 A | 5/1999 |
| JP | 2004-071437 A | 3/2004 |
| JP | 2008-248294 | 10/2008 |
| JP | 2011-150822 A | 8/2011 |

OTHER PUBLICATIONS

English translation of International Preliminary Report on Patentability (Chapter I) for PCT/JP2014/050171 dated Aug. 25, 2015.
International Search Report dated Apr. 1, 2014 for PCT/JP2014/050171.
Decision to Grant a Patent dated Mar. 31, 2014 for JP2014-508208.
Notice of Allowance dated Mar. 4, 2015 in corresponding Korean Application No. 10-2014-7031890.
Extended European Search Report dated Mar. 17, 2016 from corresponding European Patent Application No. 14754403.5-1702.

* cited by examiner

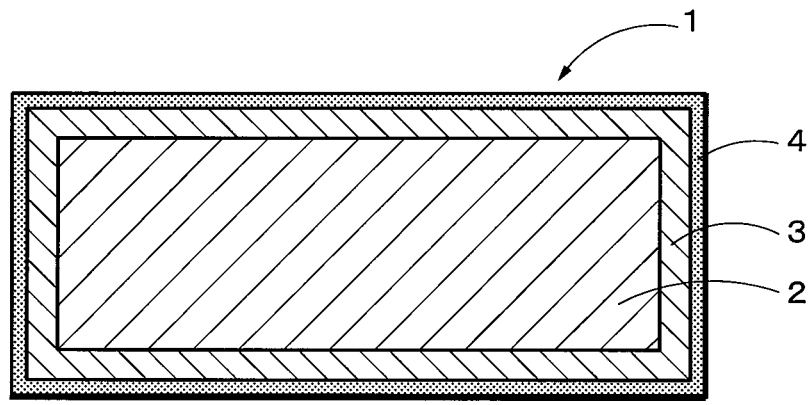
F I G. 1
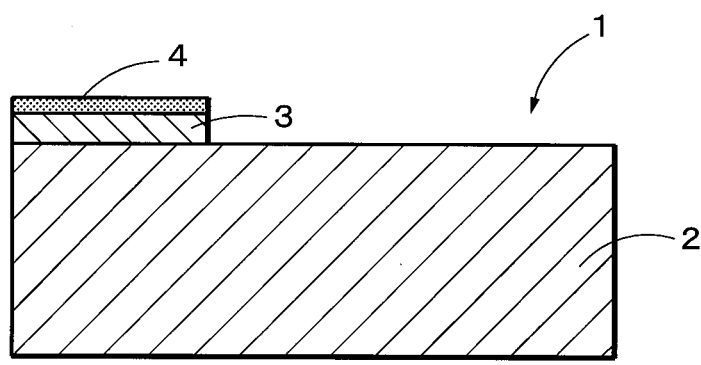
F I G. 2 A
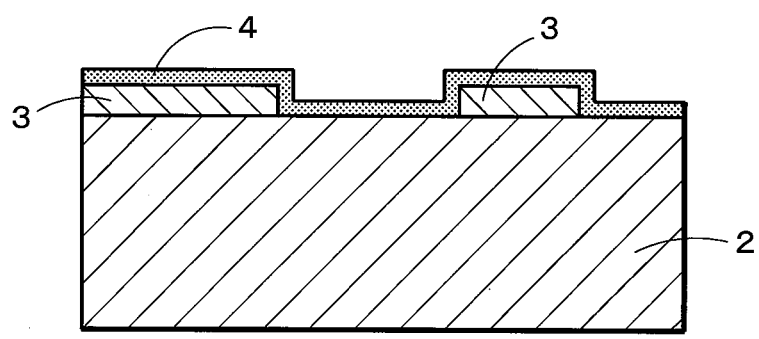
F I G. 2 B

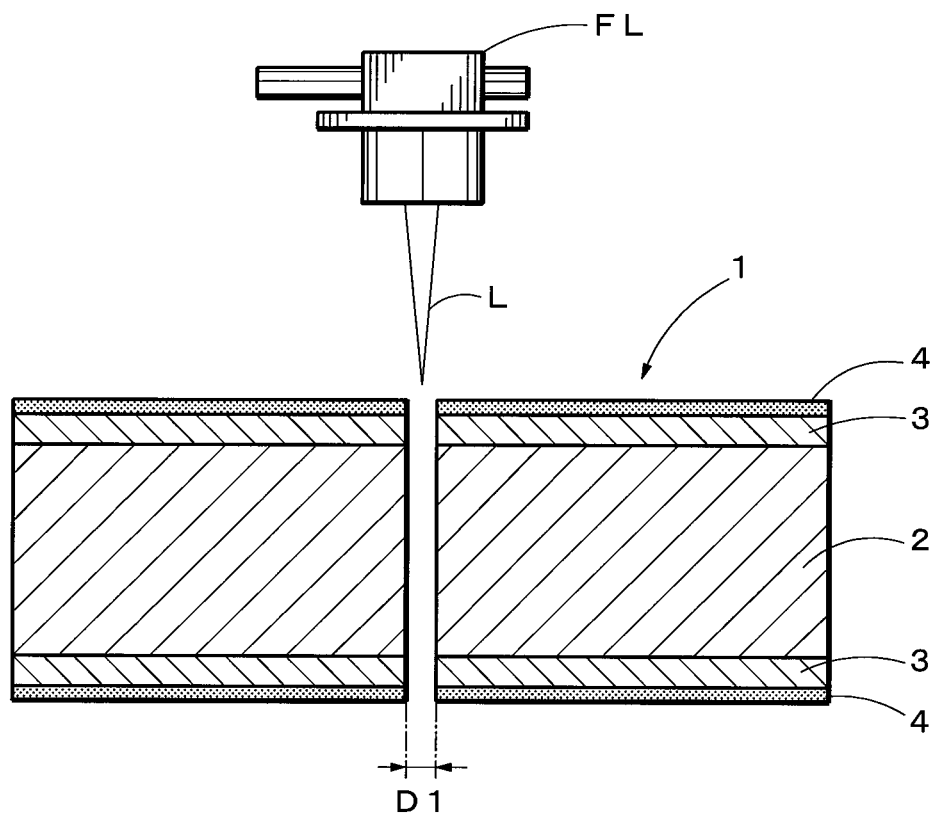
F I G. 3A
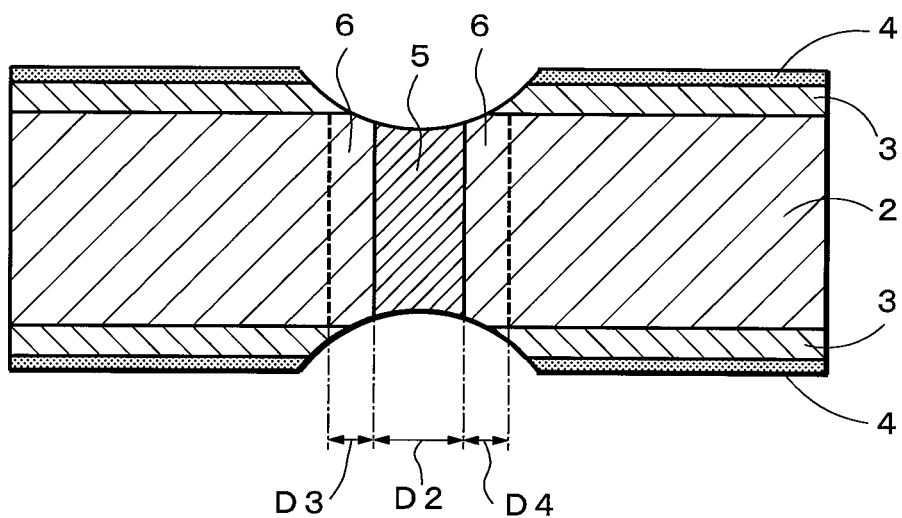
F I G. 3B

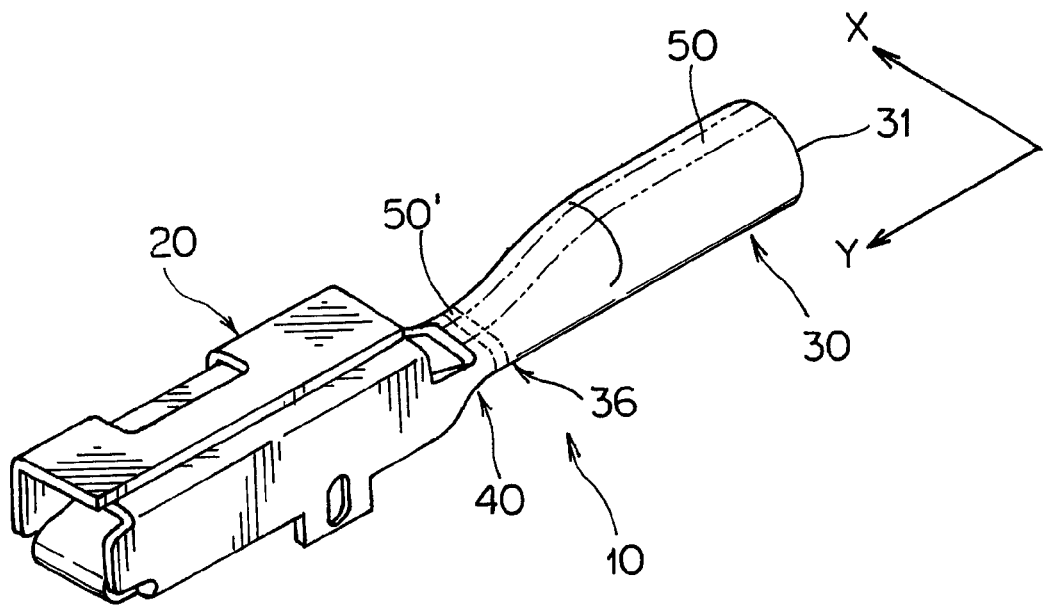
F I G. 4
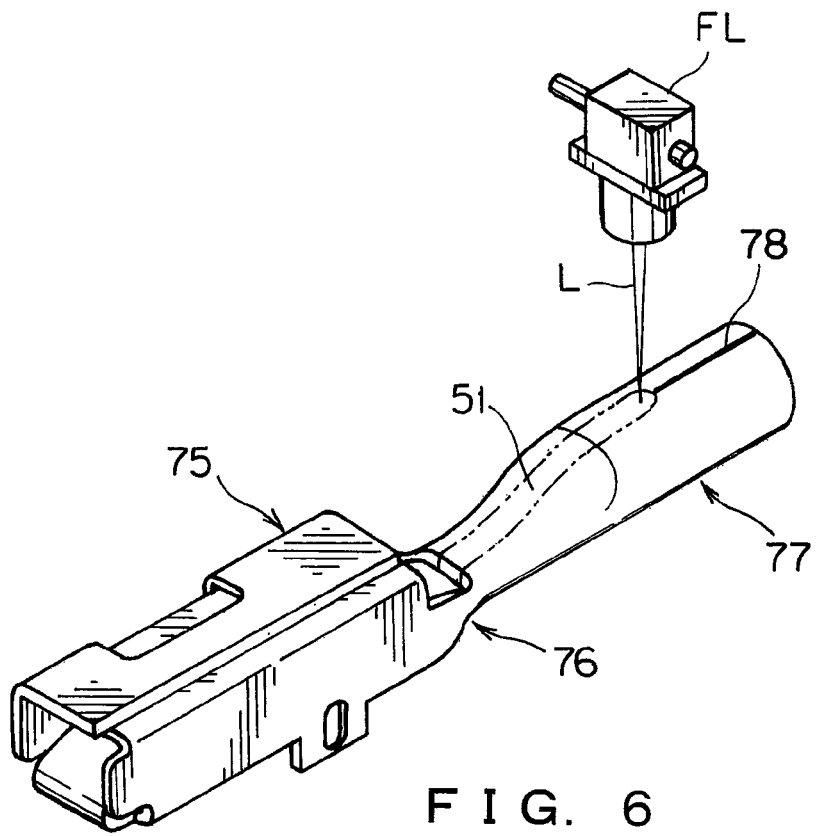
F I G. 6

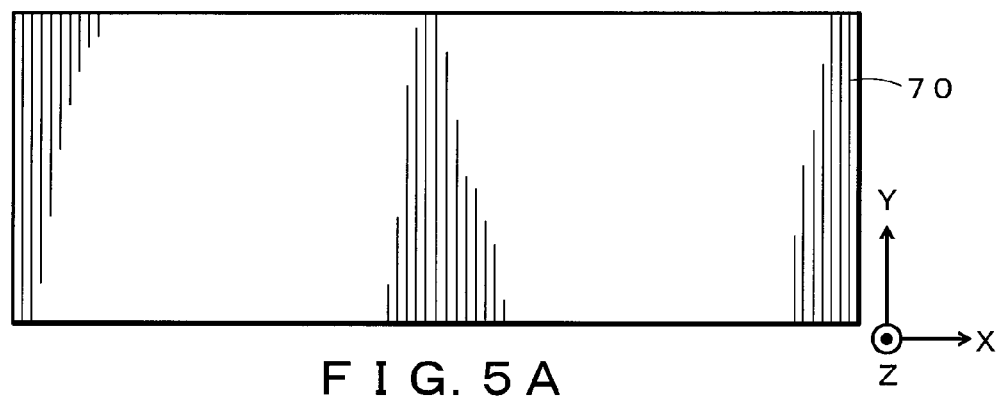
F I G. 5 A
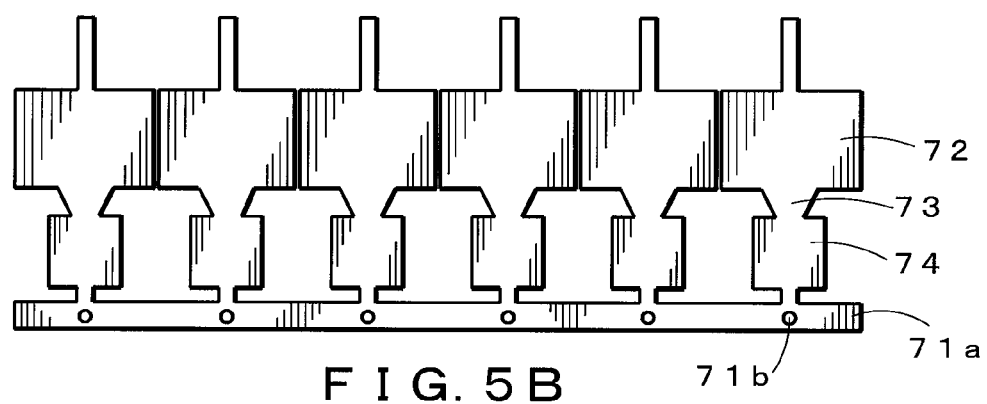
F I G. 5 B
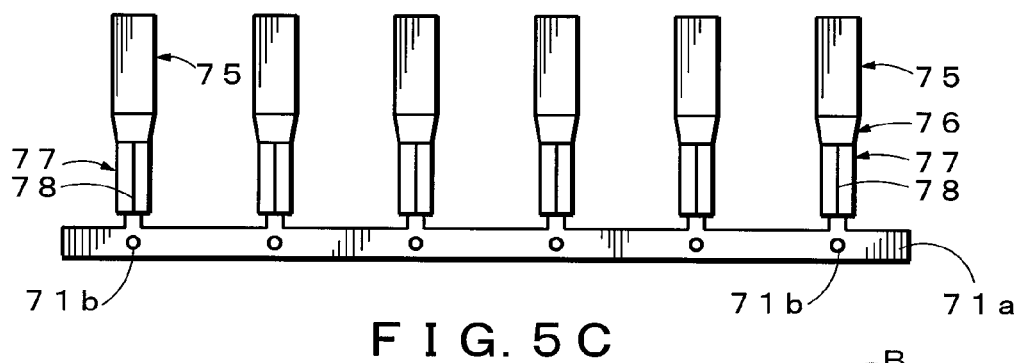
F I G. 5 C
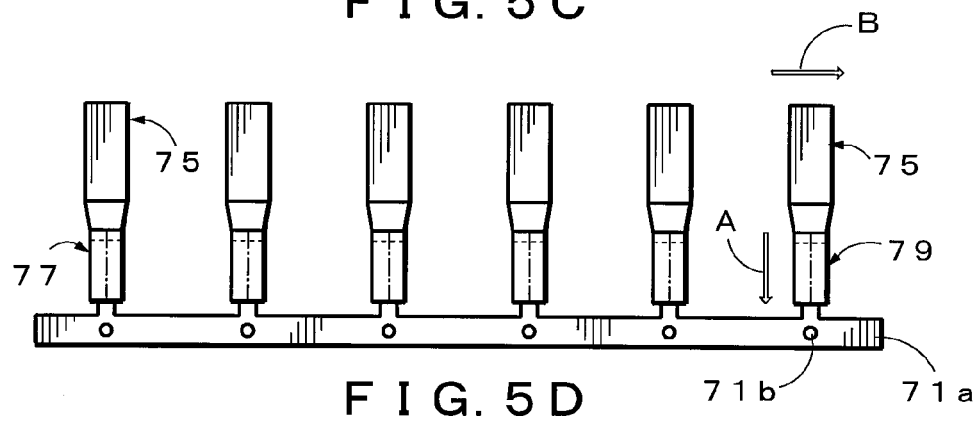
F I G. 5 D

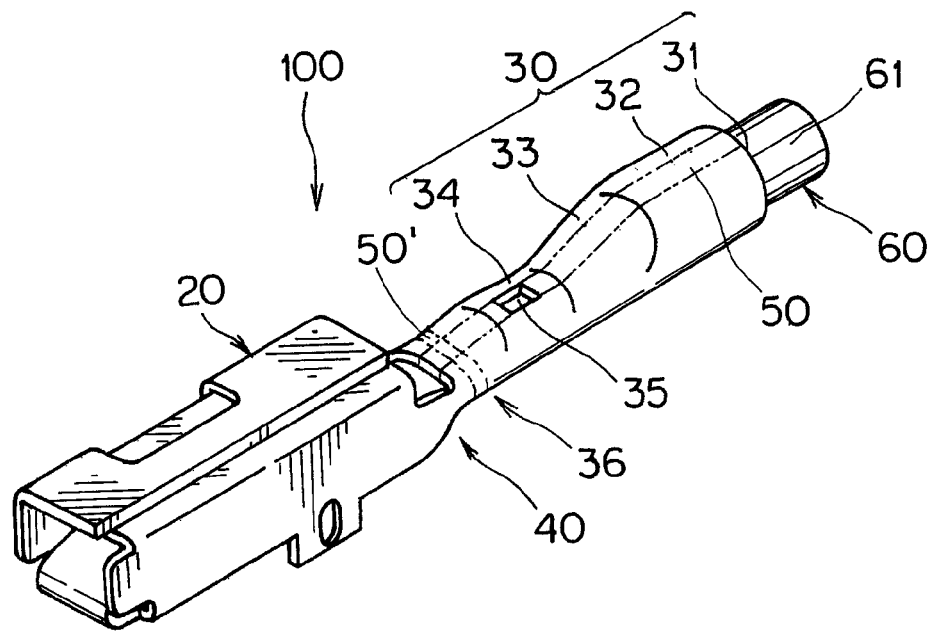
F I G. 7
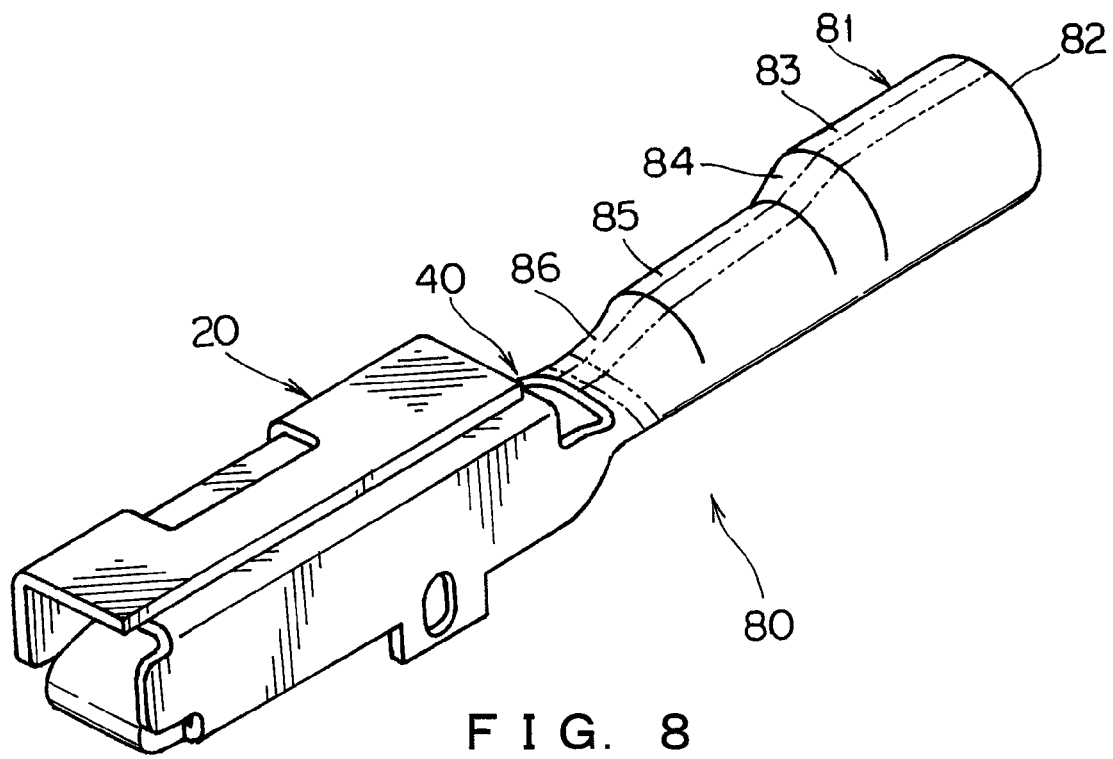
F I G. 8

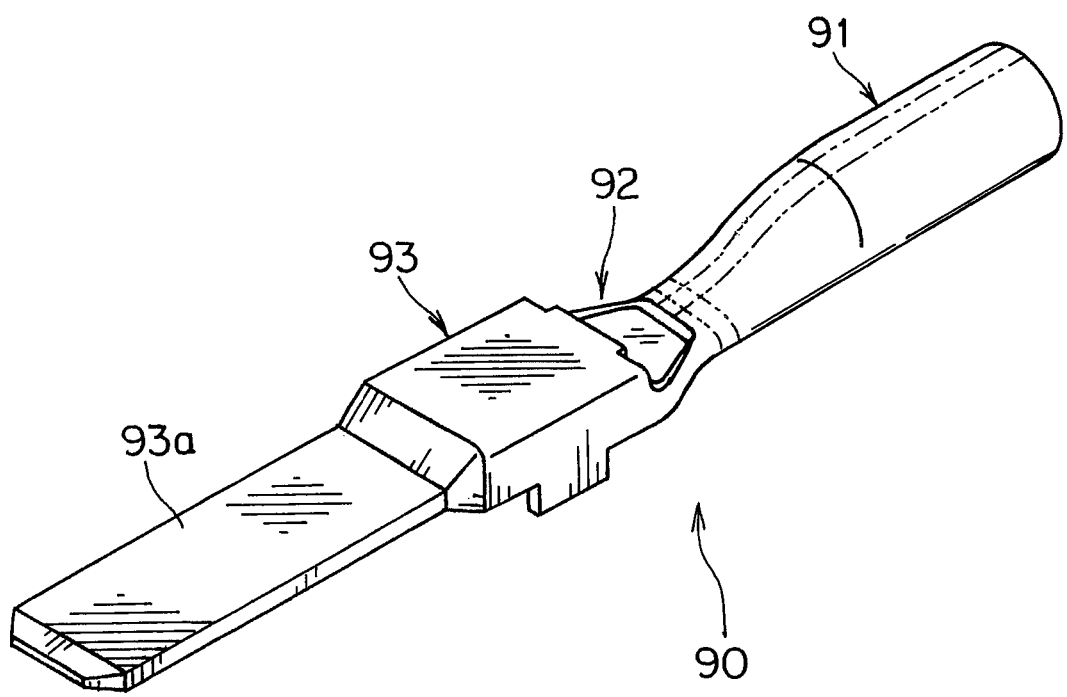
F I G. 9

//  METAL MEMBER, A TERMINAL, A WIRE CONNECTING STRUCTURE AND A METHOD OF MANUFACTURING A TERMINAL

CROSS REFERENCE TO RELATED APPLICATIONS

This is a continuation application of International Patent Application No. PCT/JP2014/050171 filed Jan. 8, 2014, which claims the benefit of Japanese Patent Application No. 2013-034072, filed Feb. 24, 2013, the full contents of all of which are hereby incorporated by reference in their entirety.

TECHNICAL FIELD

The present disclosure relates to a metal member of copper and a copper alloy having an improved laser weldability, a terminal made of such a metal member, a wire connecting structure and a method of manufacturing a terminal.

BACKGROUND

In the field of vehicles, in view of improving fuel consumption, there is a need for lightweighting of various components constituting automobiles. Particularly, a wire harness used in automobiles is a component having a second heaviest weight next to an engine in an automobile and thus, for lightweighting, there have been efforts to change a material of a conductor (core wire) of an electric wire used in the wire harness from copper to one of aluminum and an aluminum alloy. Normally, a base material made of one of copper and a copper alloy is used for a terminal connected to a leading end portion of an aluminum or aluminum alloy wire. Accordingly, since there is a possibility that exposed aluminum produces dissimilar metal corrosion and the conductor becomes defective at a connecting portion between the conductor and the terminal that are made of the aforementioned materials, it is necessary to take measures such as to shield the aluminum conductor from the outside world.

To this end, a method in which a crimp portion as a whole is formed as a closed tubular body and an electric wire conductor is covered with such a tubular body is being considered. However, it is not easy to form a closed tubular body from a flat plate material. Although it is conceivable to obtain a tubular body by processing a flat plate material into a C-shape and welding open end faces with each other, copper and a copper alloy used as a base material of the terminal has light absorptivity of less than 10% in a laser light wavelength region. In other words, since copper and a copper alloy have bad laser weldability, it was not easy to form a closed tubular body by welding. Although laser welding is possible by increasing a power of the laser light, welding defects such as blowholes are likely to occur. In addition, due to high conductivities of copper and a copper alloy per se, a heat-affected zone (HAZ, Heat-Affected Zone) is enlarged by laser welding, and thus even if laser welding is possible, cracking by stress concentration or the like is likely to occur.

Patent Document 1 proposes a method of increasing a laser light absorptivity by creating a concave light collecting wall in a laser irradiation surface (front surface). Patent Document 2 proposes a method of increasing laser light absorptivity of a material made of copper by a process such as Sn plating onto a plate material. Such a method includes placing a tab terminal portion, which is formed as a separate body, against a pattern portion, each being made of a copper alloy and constituting a bus bar, and a laser light absorptivity of the copper alloy is increased by applying a treatment such as tin plating on the base material of the tab terminal portion in advance. However, neither Japanese Laid-Open Patent Publication No. H11-144774 nor Japanese Laid-Open Patent Publication No. H10-334962 discloses improving absorptivity in a laser light wavelength region while decreasing HAZ.

The present inventors have studied the methods disclosed in Patent Documents 1 and 2 and found that, although it is possible to simply improve laser weldability, there is a problem that a region of HAZ becomes larger at the same time due to an improvement in heat transfer. When a region of HAZ is large, cracks are likely to occur due to stress concentration. Accordingly, when laser welding is performed by the methods described in Patent Documents 1 and 2, it can be said that a material property is low.

SUMMARY

It is an object of the present disclosure to provide a metal member having an improved laser weldability of copper and a copper alloy as well as a smaller HAZ region, a terminal made of such a metal member, a wire connecting structure and a method of manufacturing the terminal.

The present inventors carried out assiduous studies to attain the above object, and as a result, reached the findings that, for copper and a copper alloy, absorptivity in a laser light wavelength region is improved and HAZ can be made smaller by applying a process such as white metal plating, appropriately controlling a thickness of the white metal layer thus obtained and an arithmetic mean roughness Ra of a surface of the white metal layer, and further forming an oil film on a surface of the white metal layer. The present disclosure is obtained based on such a knowledge.

That is, the aforementioned object is achieved by the following aspects.

(1) A metal member comprising: a base material composed of one of copper and a copper alloy; a white metal layer provided on the base material at a part or entirety thereof; and an oil film provided on the white metal layer, the white metal layer having a thickness in a range of 0.01 μm to 0.80 μm, a surface of the white metal layer having an arithmetic mean roughness of in a range of 0.6 μm to 1.2 μm, the oil film having an electric double-layer capacitance in a range of 1.5 μF/cm$^2$ to 7.0 μF/cm$^2$.

(2) The metal member according to (1), wherein the white metal layer comprises at least one layer selected from a group consisting of an Sn layer, an Sn alloy layer, an Ni layer, and an Ni alloy layer.

(3) A terminal formed from the metal member according to (1) or (2), the terminal including: a connector portion adapted to mate with another terminal; a tubular crimp portion adapted to securely crimp onto a wire; a transition portion that links the connector portion and the tubular crimp portion, the tubular crimp portion being formed as a tubular body having a closed end.

(4) A wire connecting structure formed by joining the terminal of (3) and a coated wire, wherein the tubular crimped portion is crimped onto the coated wire.

(5) The wire connecting structure according to (4), wherein a conductor portion of the coated wire is composed of one of aluminum and an aluminum alloy.

(6) A method of manufacturing a terminal, comprising: punching a metal member to form a cut-out section, the metal member comprising a plate, a white metal layer, and an oil film, the plate being of a base material composed of one of copper and a copper alloy, the white metal layer being at least partially provided on the plate, the oil film being provided on the white metal layer, the white metal layer having a thickness in a range of 0.01 µm to 0.80 µm, a surface of the white metal layer having an arithmetic mean roughness in a range of 0.6 µm to 1.2 µm, the oil film having an electric double-layer capacitance in a range of 1.5 µF/cm² to 7.0 µF/cm²; bending the cut-out section to form a tubular body, the tubular body having abutted portion, a lapped portion, and an insertion opening portion; welding the butted portion of the tubular body, the white metal layer on the plate being at least where the butted portion is welded; and welding the lapped portion at an end portion of the tubular body that is opposite to the insertion opening portion to form a tubular crimp portion, the white metal layer on the plate being at least where the lapped portion is welded.

(7) The method of manufacturing a terminal according to (6), wherein the white metal layer is at least one layer selected from a group consisting of a Sn layer, a Sn alloy layer, a Ni layer, and a Ni alloy layer.

(8) The method of manufacturing a terminal according to any one of (6) to (7), wherein the welding is performed by a fiber laser.

(9) A method of manufacturing a terminal, comprising: punching a metal member to form a cut-out section, the metal member comprising a plate being of a base material composed of one of copper and a copper alloy, and a white metal layer at least partially provided on the plate, the white metal layer having a thickness in a range of 0.01 µm to 0.80 µm, a surface of the white metal layer having an arithmetic mean roughness in a range of 0.6 µm to 1.2 µm; bending the cut-out section to form a tubular body, the tubular body having a butted portion, a lapped portion, and an insertion opening portion; providing an oil film on the white metal layer, the oil film having an electric double-layer capacitance in a range of 1.5 µF/cm² to 7.0 µF/cm²; welding the butted portion of the tubular body, the white metal layer on the plate being at least where the butted portion is welded; and welding the lapped portion at an end portion of the tubular body opposite to the insertion opening portion to form a tubular crimp portion, the white metal layer on the plate being at least where the lapped portion is welded.

(10) The method of manufacturing a terminal according to (9), wherein the white metal layer is at least one layer selected from a group consisting of a Sn layer, a Sn alloy layer, a Ni layer, and a Ni alloy layer.

(11) The method of manufacturing a terminal according to any one of (9) to (10), wherein the welding is performed by a fiber laser.

(12) A method of manufacturing a terminal, comprising: punching a metal member to form a cut-out section, the metal member comprising a plate being of a base material composed of one of copper and a copper alloy, and a white metal layer at least partially provided on the plate, the white metal layer having a thickness in a range of 0.01 µm to 0.80 µm, a surface of the white metal layer having an arithmetic mean roughness in a range of 0.6 µm to 1.2 µm; providing an oil film on the white metal layer while bending the cut-out section to form a tubular body, the oil film having an electric double-layer capacitance in a range of 1.5 µF/cm² to 7.0 µF/cm², the tubular body having a butted portion, a lapped portion, and an insertion opening portion; welding the butted portion of the tubular body, the white metal layer on the plate being at least where the butted portion is welded; and welding the lapped portion at an end portion of the tubular body opposite to the insertion opening portion to form a tubular crimp portion, the white metal layer on the plate being at least where the lapped portion is welded.

(13) The method of manufacturing a terminal according to (12), wherein the white metal layer is at least one layer selected from a group consisting of a Sn layer, a Sn alloy layer, a Ni layer, and a Ni alloy layer.

(14) The method of manufacturing a terminal according to any one of (12) to (13), wherein the welding is performed by a fiber laser.

Here, the arithmetic mean roughness Ra is a kind of a roughness defined in JIS B0601-2001. Before the revision of JISB0601 in 1994, it was referred to as a center line average roughness Ra in a similar definition content.

Since the metal member of the present disclosure has a white metal layer of a predetermined thickness and a predetermined roughness on a base material composed of one of copper and a copper alloy and further has an oil film of a predetermined electric double-layer capacitance on a surface thereof, laser welding can be performed using such a metal member efficiently and HAZ after the laser welding can be decreased. Therefore, a metal member having improved laser weldability can be provided. Such a metal member is particularly suitable for a terminal, and it is further preferable for a wire connecting structure comprising such a terminal. Furthermore, a method of manufacturing the terminal of the present disclosure uses a metal member having improved laser weldability, and it is preferable as a method of obtaining the aforementioned terminal.

BRIEF DESCRIPTION OF DRAWINGS

FIG. 1 is a cross sectional view schematically showing a configuration of a metal member of the present disclosure.

FIGS. 2A and 2B are cross sectional views showing other configurations of the metal member of the present disclosure.

FIG. 3A is a cross sectional view showing metal members of the present disclosure before being welded with each other, and FIG. 3B is a cross sectional view showing metal members of the present disclosure after being welded.

FIG. 4 is a perspective view showing an example of a terminal of the present disclosure.

FIGS. 5A to 5D are plan views for explaining a manufacturing method of the terminal of FIG. 4.

FIG. 6 is a perspective view showing a laser welding process of FIG. 5D.

FIG. 7 is a perspective view showing an example of a wire connecting structure of the present disclosure.

FIG. 8 is a perspective view showing a variant of the terminal of the present disclosure.

FIG. 9 is a perspective view showing another variant of the terminal of the present disclosure.

DETAILED DESCRIPTION

A metal member 1 of the present disclosure has, for example, as shown in FIG. 1, a base material 2 composed of one of copper and a copper alloy, a white metal layer 3 provided on a part of or an entirety of the base material 2, and an oil film 4 provided on the white metal layer. As for the metal member 1 of the present disclosure, the white metal layer has a thickness of 0.01 µm to 0.80 µm, a surface of the white metal layer has an arithmetic mean roughness Ra of 0.6 µm to 1.2 µm, and the oil film has an electric double-layer capacitance of 1.5 µF/cm² to 7.0 µF/cm².

(Base Material)

The base material 2 is composed of copper (e.g., tough pitch copper or oxygen free copper) or a copper alloy, and is preferably composed a copper alloy. Examples of the copper alloy used for the terminal include, for example, brass (e.g., C2600, C2680 of CDA (Copper Development Association)), phosphor bronze (e.g., C5210 of CDA), a Corson copper alloy (Cu—Ni—Si—(Sn, Zn, Mg, Cr) copper alloy). Among those, a Corson copper alloy is preferable from an overall point of view including intensity, conductivity, and cost. Examples of the Corson copper alloy may be, but not limited to, for example, copper alloys FAS-680 and FAS-820 (product names, respectively) manufactured by Furukawa Electric Co., Ltd., copper alloys MAX-375 and MAX251 (product names, respectively) manufactured by Mitsubishi Shindoh Co., Ltd. Further, C7025 or the like of CDA can be used.

Further, examples of other copper alloy compositions include, for example, a Cu—Sn—Cr copper alloy, a Cu—Sn—Zn—Cr copper alloy, a Cu—Sn—P copper alloy, a Cu—Sn—P—Ni copper alloy, a Cu—Fe—Sn—P copper alloy, a Cu—Mg—P copper alloy, and a Cu—Fe—Zn—P copper alloy. Indicental impurities other than essential elements described above may of course be included.

For punching and pressing, it is preferable that the base material 2 has a thickness of 0.08 mm to 0.64 mm.

(White Metal Layer)

The white metal layer 3 is a layer composed of a metal or an alloy thereof having a color of white or gray close to white (a dull color) and may have a tint of a faint blue, red, silver or other colors. A white metal is preferably at least one metal or an alloy selected from a group consisting of tin (Sn), a Sn alloy, nickel (Ni) and a Ni alloy. The white metal layer 3 may be provided as at least one layer provided on a part or an entirety of the base material 2 composed of copper or a copper alloy. A plurality of layers, i.e., two or more layers, may be provided. For example, only one layer of a Sn layer or a Ni layer may be provided as a single layer on the base material 2 composed of copper or a copper alloy. Alternatively, for example, a Ni layer or a Ni alloy layer may be provided as an intermediate layer on the base material 2 composed of one of copper and a copper alloy, and one layer of Sn layer may be provided on the intermediate layer. Note that, in the present disclosure, the intermediate layer may be formed of a metal or an alloy other than white metals and may be formed of a white metal. In a case where the intermediate layer is formed of a white metal, it does not necessarily satisfy an arithmetic mean roughness Ra of a surface specified as the white metal layer of the present disclosure. That is, the arithmetic mean roughness Ra of a surface of the white metal layer at an outermost position is important. The thickness of the intermediate layer and the surface arithmetic mean roughness are not particularly limited and can be appropriately set within a range in which laser weldability of the metal member is not inhibited.

The white metal layer 3 has a thickness of 0.01 μm to 1.00 μm, and preferably 0.10 μm to 0.80 μm, and further preferably 0.10 μm to 0.40 μm. The thickness of the white metal layer 3 is measured by a fluorescent X-ray film thickness meter. The arithmetic mean roughness Ra of a surface of the white metal layer 3 is preferably greater than or equal to 0.5 μm, and more preferably 0.6 μm to 1.2 μm. With the thickness of the white metal layer 3 and the surface arithmetic mean roughness Ra being within predetermined ranges, an improved absorptivity of laser light is obtained in performing the laser welding. Thus, an appropriate heat input can be applied to the base material 2 and it becomes easy to perform a good welding. As a result, after the welding, occurrence of blowholes can be suppressed and a width of HAZ can be reduced.

Hereinafter, in the present disclosure, such "at least one layer of a white metal layer having a thickness of 0.01 μm to 1.00 μm and the surface arithmetic mean roughness Ra of greater than or equal to 0.5 μm" is simply referred to as a "white metal layer."

A method of forming such a white metal layer 3 is not particularly limited, and, for example, various kinds of film formation techniques such as an electroplating process of tin and nickel as well as electroless plating, hot dipping, vapor deposition, ion plating, sputtering, chemical vapor deposition, or the like may be employed. Among those, from the viewpoint of operability or cost, it is preferable to provide the white metal layer 3 by applying a plating process. Hereinafter, the white metal layer 3 will be described by taking, for example, a tin plating layer, a tin alloy plating layer, a nickel plating layer, and a nickel alloy plating layer as representative examples.

According to the present disclosure, the white metal layer 3 that absorbs light more easily than copper or a copper alloy in a near infrared wavelength region is disposed at least in a region irradiated with laser on a surface of copper or a copper alloy on a side on which laser is irradiated. The white metal layer 3 may be formed under predetermined conditions described below and can be formed as a white metal layer in which its surface is controlled to a predetermined rough state having a high laser light absorptivity. Examples of a tin alloy include tin-cobalt, tin-palladium, tin-copper, tin-bismuth, and tin-silver. Examples of a nickel alloy include nickel-zinc, nickel-tin, and nickel-phosphorus.

Since a white metal such as tin or nickel has a higher laser light absorptivity (lower laser light reflectance) in a wavelength region of a laser light than that of copper or a copper alloy, providing the white metal layer 3 on the base material 2 results in improved weldability. Action thereof can be considered as follows. First, a metal constituting the white metal layer, e.g., tin or nickel, melts due to energy of laser light. Then, heat energy propagates from molten tin or nickel, and copper or the copper alloy composing the base material 2 directly underneath melts. After the laser irradiation, the molten metal copper solidifies together with metal tin and metal nickel, and the joining completes. The metal or the alloy composing the white metal layer melts after the laser welding by laser irradiation, and is taken into copper or a copper alloy composing the base material 2 at the weld portion (reference numeral 50 in FIG. 4 described later). This is a state where tin or nickel that existed as a tin layer or a nickel layer before the welding have been taken into a solidification structure due to the welding and exists as a solid solution in a copper parent phase, and/or, a state of being crystallized in/out the copper parent phase as a Cu—Sn intermetallic compound or a Cu—Ni intermetallic compound. Note that tin and nickel may attach to an outer side of the weld portion, and in such a case, a part of tin or nickel is not taken into the base material 2 and remains on the surface of the base material 2 after the welding.

Hereinafter, layer formation of the white metal layer 3 by electroplating will be described. In order to form the white metal layer 3 on a surface, it is preferable that the settings of the plating conditions is set such that a current density is set at a high current density in such a range that a gray coating is not produced to roughen a surface. The current density is, although it may depend on the plating bath condition, for example, in the case of a Sn plating bath according to the present example, 5 A/dm$^2$ to 10 A/dm$^2$, and, in the case of a Ni plating bath, 20 A/dm$^2$ to 30 A/dm$^2$. Also, a higher current density can be achieved by increasing an activity. As an example, a rate of stirring of the plating bath may be increased. In an experiment in a laboratory, it is preferable that the current density and the stirring condition are adjusted at the same time concerning the devices.

(Oil Film)

The oil film 4 is provided on the white metal layer 3. Since an oil exists on the white metal layer 3, absorption of the laser light at the time of laser welding further increases. Thus, laser welding can be performed effectively. When the oil film 4 has an electric double-layer capacitance of 1.5 $\mu F/cm^2$ to 7.0 $\mu F/cm^2$, it contributes to an effective laser welding. An electric double-layer capacitance lower than such a range is not preferable since it is difficult to contribute to an improvement in the weldability of the base material 2 and the white metal layer 3 and causes an increase in the HAZ width. When an electric double-layer capacitance is greater than such a range, an amount of oil film that burns due to the heat of the welding increases, which may cause a weld defect and likely to become a cause of an appearance defectiveness such as soot. More preferably, the oil film 4 has an electric double-layer capacitance of 2.0 $\mu F/cm^2$ to 6.0 $\mu F/cm^2$.

The electric double-layer capacitance is measured by electric double-layer capacitance measurement. The metal member 1 is immersed in an electrolyte aqueous solution to provide a capacitor structure in which the oil film 4 between a metal part (the base material 2 and the white metal layer 3) and an aqueous solution is regarded as a dielectric. Thus, electric double-layer capacitance can be measured by applying electricity and measuring an electric potential.

The oil film 4 has an electric double-layer capacitance that depends on a type of an organic compound composing the oil film and a state of mixture with other components. However, the electric double-layer capacitance can also be adjusted by a thickness of the oil film. In general, a relationship between an electric double-layer capacitance C and an oil film thickness d is expressed as $1/C=A \times d+B$ (A and B being constants). Therefore, the electric double-layer capacitance can be adjusted by adjusting the oil film thickness d. Note that the constants A and B differ depending on types of the oil film 4 or conditions (respective thickness and surface state) of the base material 2 and the white metal layer 3.

It is desirable that an oil that forms the oil film 4 is, for example, a metalworking oil (press oil, rolled oil, cutting oil), and particularly desirably, a lubricant for water-insoluble metal plastic working (e.g., G-6316F manufactured by Nihon Kosakuyu Co., Ltd.). The oil film 4 may be provided by spreading oil on the white metal layer 3 or may be provided by leaving the press oil used in pressing when punching into a shape of a terminal, etc., without removing after the pressing. Normally, after the rolling process or the pressing process, a surface of a product obtained by such processes is degreased to remove these oils. According to the present disclosure, the removing process of the oil can be dispensed with to thereby leave the oil, and the oil can be utilized in improving the laser weldability. Of course, cleaning may be performed after the pressing and a necessary oil film may be provided again. Also, a mixture of a plurality of types of oils may be used.

In the present disclosure, the surface on which the oil film 4 is provided is not necessarily limited to the white metal layer 3. Since the white metal layer 3 may be provided on a part of the base material 2, in such a case, the oil film 4 may be provided on at least the white metal layer 3. In other word, the oil film 4 may be provided on the base material 2. Those states are shown in FIGS. 2A and 2B. The metal member 1 shown in FIG. 2A includes a base material 2 composed of one of copper and a copper alloy, a white metal layer 3 provided on a part of the base material 2, and an oil film 4 provided on the white metal layer 3. The metal member 1 shown in FIG. 2B includes a base material 2 composed of one of copper and a copper alloy, a white metal layer 3 provided at two regions on a part in the base material 2, and an oil film 4 provided on base material 2 and the white metal layer 3. In these cases, the electric double-layer capacitance of the oil film 4 on the white metal layer 3 may be 1.5 $\mu F/cm^2$ to 7.0 $\mu F/cm^2$. Even in such an embodiment, weldability of a portion having the predetermined white metal layer 3 and the oil film 4 of the present disclosure is good.

Note that the oil film 4 may be removed after the welding of the metal member. That is, the oil film 4 is necessary for the metal member 1 of the present disclosure, whereas the oil film 4 need not necessarily remain on the white metal layer 3 in a final product state (electric electronic component or the like) after the welding and the processing of the metal member 1. In the final product state, the oil film 4 need not have a predetermined electric double-layer capacitance.

(Welding of the Metal Member)

FIG. 3A is a cross sectional view showing a state before welding the metal members 1 with each other. In such a welding, the welding is performed by arranging two metal members 1 to be welded with each other at a predetermined interval D1 and irradiating the welding laser L at a substantially center location of the interval D1. Such welding is referred to as butt welding. The interval D1 varies depending on the welding method, but it is preferably narrow to avoid a decrease in volume after the welding. It is usually set at less than or equal to 1.0 mm. FL in the figure shows a fiber laser apparatus as an example of the laser welding apparatus. Laser light L is irradiated from the fiber laser apparatus FL and the metal members 1 are welded with each other. In the vicinity of the welded portion of the metal member 1, namely the portion where the laser light is irradiated, at least the predetermined white metal layer 3 and the oil film 4 of present disclosure are formed. With the predetermined white metal layer 3 and the oil film 4, the base material 2 composed of one of copper and a copper alloy which were difficult to weld in the related art can be welded well.

FIG. 3B shows a cross sectional view after having welded the metal members 1 shown in FIG. 3A with each other. When the metal members 1 are welded with each other, a weld portion 5 is formed in the vicinity of the portion where laser light is irradiated. The weld portion 5 is an alloy in which metal components of the base material 2 and the white metal layer 3 are mainly melted and mixed. The weld portion 5 has a rapidly-solidified structure, and may include therein organic matters derived from the oil film 4, oxides, or the like. A width D2 of the weld portion 5 is usually greater than the interval D1. Also, as a result of the welding, since the metals of the base material 2 and the white metal layer 3 fill a space portion with the interval D1, the metal member after the welding often has a decreased thickness centered on a position where laser welding light was irradiated. However, when butt-welding the metal members while applying a load in a butt direction, there may be a case where the thickness of the metal member is maintained. FIG. 3B is a schematic view for a case where the thickness of the metal member decreases.

Also, a heat-affected zone (HAZ) 6 is formed at a part of the base material 2 adjacent to the weld portion 5. The heat-affected zone is a portion that did not dissolve at the time of welding but became a structure different from a metallographic structure of a normal base material 2 by receiving heat. More specifically, in the present disclosure, it refers to a portion having a hardness of less than or equal to 80% of that of the normal base material 2. In other words, the hardness of the base material 2 is measured in advance and a portion that has a hardness value of less than or equal to 80% of the measured hardness is defined as a heat-affected zone (HAZ) 6. Note that, a portion having a hardness value of greater than 80% of the hardness value of the base material 2 is regarded as a structure which is almost equivalent to the base material 2 and not included in the heat-affected zone (HAZ), although it is affected by heat. In the present disclosure, a width of HAZ is defined as a length in a direction perpendicular to the thickness of the base material 2 in a specific cross section. The width of HAZ represents a degree of extension with the laser light being the center. Accordingly, the width of HAZ is evaluated by an average value of D3 which is a width of heat-affected zone (HAZ) 6 on one side of the weld portion 5, and a width D4 of other heat-affected zone (HAZ) 6 in FIG. 3B. Normally, a difference between the values of D3 and D4 is not large. The hardness of the base material and the hardness of the heat-affected zone (HAZ) can be measured with well-known measures. Note that it is preferable to use a nanoindenter for a cross section of the base material 2, since a measuring region is small.

The metal members are welded with each other using near-infrared laser light. The near infrared laser light has an emission wavelength of 0.7 µm to 2.5 µm, and preferably a laser light having an emission wavelength of 1.0 µm to 2.0 µm is used. Such a laser light may be an yttribium (Yt) doped glass fiber laser light (emission wavelength 1084 nm), an erbium (Er) doped glass fiber laser light (emission wavelength 1550 nm), or the like.

The welding is performed using a fiber laser apparatus that continuously emits a near infrared laser light. However, a laser apparatus other than such a laser apparatus may also be used. For example, a YAG laser light emitting apparatus, a glass laser light emitting apparatus and the like that perform continuous emission or a laser light emitting apparatus that performs pulsed emission may be employed. Among these, it is preferable to use a fiber laser emitter due to a narrow spreading angle, a small beam diameter of the laser light, stability of the laser continuous emission, or the like.

As described above, the metal member 1 of the present disclosure has an improved laser weldability since it includes the white metal layer 3 having a predetermined thickness and a predetermined roughness formed on the base material 2 composed of one of copper and a copper alloy, and the oil film 4 having an predetermined electric double-layer capacitance formed on the white metal layer 3. Since it is possible to improve the laser weldability of copper, which used to be considered difficult, products having shapes which are more complicated than the related art can be produced by performing the welding on the base material composed of copper and a copper alloy. Also, with the metal member 1 of the present disclosure, HAZ after the laser welding can be decreased. Therefore, the cracks due to stress concentration or the like can be prevented.

(Terminal With Tubular Crimp Portion)

One embodiment of the terminal made of the metal member of the present disclosure will be described with reference to the drawings. Note that the embodiment below are described by way of example, and various embodiments are possible as long as they are within the technical scope of the present disclosure.

FIG. 4 is a diagram showing a terminal 10 made of the metal member of the present disclosure. The terminal 10 has a connector portion 20 of a female terminal, a tubular crimp portion 30 that, after an electric wire has been inserted therein, connects the electric wire and the terminal 10 by being crimped, and a transition portion 40 that links the connector portion 20 and the tubular crimp portion 30. Further, the terminal 10 has a weld portion 50 (a region indicated with a broken line in the figure) in the tubular crimp portion 30. The terminal 10 is formed from a flat plate material of the metal member of the present disclosure.

The connector portion 20 is a box portion that allows insertion of an insertion tab such as a male terminal. In the present disclosure, the shape of the details of the connector portion 20 is not particularly limited. That is, in other embodiments of the terminal of the present disclosure, it does not need to be a box portion, and, for example, may be an insertion tab of a male terminal instead of the box portion. Also, it may be an end portion of the terminal according to other embodiments. Herein, an example of a female terminal is shown for the sake of convenience of describing the terminal of the present disclosure. As long as the terminal has the tubular crimp portion 30 provided via the transition portion 40, the terminal may have any kind of connecting end portion.

The tubular crimp portion 30 is a portion at which the terminal 10 and an electric wire (not shown) are crimped and joined. One end of the tubular crimp portion 30 is an insertion opening portion 31 in which an electric wire can be inserted, and the other end thereof is connected to the transition portion 40. The tubular crimp portion 30 is a closed tubular body with its transition portion 40 side being sealed with a sealing portion 36. That is, the tubular crimp portion 30 is a tubular body that is closed except for the insertion opening portion 31. With the sealing portion 36, moisture or the like is prevented from entering from the transition portion 40 side. An inner diameter of a tube of the tubular crimp portion 30 reduces continuously or step-wise from the insertion opening portion 31 to the sealing portion 36. Since the tubular crimp portion 30 is only required to be a tubular body, a cross section perpendicular to its longitudinal direction is not necessarily circular, and may be an oval, a rectangle, or other shape as the case may be.

At the tubular crimp portion 30, the metal member constituting the tubular crimp portion and an electric wire are electrically and mechanically crimped and joined. Particularly, the electrical joining is performed by strongly pressing (crimping) the metal member and an electric wire conductor. Further, since a part of an insulating coating portion of the electric wire is also crimped at the same time, the tubular crimp portion 30 tightly attaches the insulating coating portion of the electric wire. Particularly, at the insertion opening portion 31, it is preferable to tightly attach without gap so that moisture does not enter from between the metal member of the tubular crimp portion 30 and the electric wire coating portion.

The tube of tubular crimp portion 30 may be provided with electric wire engaging grooves (not shown) at an inner side thereof. When one of aluminum and an aluminum alloy is used as the conductor of the electric wire, its surface is covered with an oxide film. Thus, by providing such grooves, a contact pressure can be increased with elevated portions between the grooves and reliability of mechanical-electrical connection improves.

The tubular crimp portion 30 is formed by processing a flat plate material of the metal member of the present disclosure. More specifically, the plate material of the metal member of the present disclosure is punched into a spread-out shapes of the terminals and pressed into three-dimensional shape to form the tubular body having a generally C-shaped cross-section. Then, an open portion of the tubular body (butted portion) is welded. Since the welding is performed along a longitudinal direction (Y-direction in FIG. 4) of the tubular body, the tubular crimp portion is formed while the weld portion 50 is being formed in a direction which is generally the same as the longitudinal direction. Further, after the welding to form the tubular crimp portion, the end portion of the tubular crimp portion of the transition portion side is welded in a width direction (X-direction in FIG. 4) and a sealing portion 36 is provided by forming a weld portion 50'. The sealing portion 36 seals by, squeezing and overlapping the two opposed tube walls (usually upper and lower tube walls) of the tubular crimp portion 30, and welding the lapped portion from the above.

Here, the weld portion 50 is formed by welding a portion where the white metal layer and the oil film of the metal member of the present disclosure are formed. The white metal layer and the oil film that existed in a region irradiated and dissolved with the welding laser light have disappeared from the surface after the welding. On the other hand, the white metal layer that existed in a region where a welding laser light was not irradiated and dissolved remains. The oil film that was in the region not irradiated and dissolved with the welding laser light may either disappear as a whole due to the heat of the welding or partly remain. For example, tin, nickel, or the like that were composing the disappeared white metal layer are melted and taken into the weld portion 50, and may be taken in to the heat-affected zone, or may be dispersed. Although it cannot be described in general, the dispersed state of tin and nickel may be, depending on the conditions of the laser welding, such a state that they are taken into a solidified structure and exist as a solid solution in a copper parent phase and/or a state that they are crystallized as an intermetallic compound of copper and tin and an intermetallic compound of copper and nickel.

Note that the transition portion 40 is a portion that bridges between the connector portion 10 and the tubular crimp portion 30. It can be formed three-dimensionally or formed in a planar manner. Considering a mechanical strength against folding in a longitudinal direction of the terminal, it should be designed in such a manner that a second moment of area in a longitudinal direction increases.

(Method of Manufacturing a Terminal)

FIGS. 5A to 5D are plan views for explaining an example of a method of manufacturing the terminal of FIG. 4. Note that FIGS. 5A to 5D are diagrams of how a terminal is made from a plate material 70 of the metal member 1 viewed in a Z-direction (a direction perpendicular to a plate surface) of the plate material 70.

Firstly, the plate material 70 of the metal member 1 having a base material composed of a copper alloy is prepared. For example, with a Corson copper alloy (Cu—Ni—Si alloy) having a plate thickness of 0.25 mm as the base material, a tin layer is provided as a predetermined white metal layer on an entire surface of the base material by plating. Further, a predetermined oil film is provided on an entire surface in the white metal layer to obtain a plate material 70 of the metal member.

The plate material 70 is punched by a pressing process (primary press) into a repeated shape in such a manner that a plurality of terminals are in a spread-out state. With the present pressing process, a workpiece of a so-called cantilevered type in which each workpiece is supported at one end is fabricated, and a plate-like body for connector portion 72, a plate-like body for transition portion 73 and a plate-like body for tubular crimp portion 74 are formed integrally with a carrier portion 71a in which perforations 71b are formed at equal intervals (FIG. 5B). At this time, original plates of the respective terminals are punched in such a manner that they are arranged at a predetermined pitch along an X-direction and a longitudinal direction of the tubular crimp portion to be formed later is a Y-direction.

Then, the original plate of each terminal is subjected to a bending process (secondary press) to form a connector portion 75, a transition portion 76 and a tubular body for crimp portion 77 to be formed into a tubular crimp portion. At this time, a cross section which is perpendicular to the longitudinal direction of the tubular body for crimp portion 77 is substantially C-shaped with an extremely small gap. The end surfaces of the metal member across such a gap is referred to as a butted portion 78 (FIG. 5C). The butted portion 78 extends in the Y-direction. Further, at the end portion of the transition portion side of tubular body for crimp portion 77, a lapped portion (not shown) is provided in such a manner that an inner wall of the tubular body contacts in the Z-direction.

Thereafter, for example, a laser light is irradiated from above the tubular body for crimp portion 77 and swept in a direction of an arrow A in the figure along the butted portion 78 to apply laser welding to such a portion (FIG. 5D). Thereby, the butted portion 78 is welded. Further, an end portion on a transition portion 76 side of the tubular body for crimp portion 77 is welded and sealed by sweeping the lapped portion in a direction of an arrow B direction in the figure. With these weldings, the tubular crimp portion 79 that is a closed tubular body in which portions other than the insertion opening portion for the electric wire are closed is formed. Note that in any of the weldings, a weld portion (a belt-like weld portion which is also referred to as a weld bead) is formed as a welding trace. In the figure, a dash-dot line is the weld portion where the butted portion 78 is welded, and a broken line is the weld portion where the lapped portion is welded. As will be described below, it is preferable that the welding is performed using a fiber laser. The laser welding apparatus may be the one in which a focal position during welding can be adjusted three-dimensionally and is capable of three-dimensionally welding a reduced-diameter portion of the tubular body.

FIG. 6 is a perspective view showing a laser welding process of FIG. 5D. As shown in FIG. 6, for example, a fiber laser welding apparatus FL emitting a laser light having an infrared wavelength of 1084 nm±5 nm is used, and the butted portion 78 of the tubular body for crimp portion 77 is welded at a laser power of 100 W to 500 W, a sweep rate of 90 mm/sec to 180 mm/sec, and a spot diameter of approximately 20 µm. With the laser L being irradiated along the butted portion 78, the weld portion 51 is formed at substantially the same position as the butted portion 78. More specifically, with the laser light L emitted from the fiber laser welding apparatus FL being irradiated and energy of the laser light being converted into heat, at first, a part of the oil film on the butted portion 78 burns and transfers heat to melt the white metal layer, and subsequently melts the base material itself which constitutes the butted portion 78 by propagating the melting thermal energy. Thereafter, a weld portion 51 is provided by a rapid cooling. Note that the interval of the gap between the end surfaces of the butted portion 78 and the width of weld portion 51 do not necessarily match with each other.

Normally, since a copper alloy has a bad absorption efficiency for the laser light having the emission wavelength of a near infrared region, there may be a case where the welding width cannot be decreased and the width of the heat-affected zone (HAZ) cannot be narrowed. Also, due to laser welding, the copper alloy may have decreased mechanical characteristic at a weld portion and the vicinity thereof. The aforementioned problem is overcome by forming a predetermined white metal layer and an oil film on a part of the base material to be welded and by using laser light having a high energy density such as the fiber laser light.

Since the surface of the white metal layer (e.g., the surface of the Sn layer or the Ni layer that constitutes the white metal layer) reflects less near infrared laser light than the copper alloy surface, the absorptivity of the near infrared laser light is good. For example, with the reflectometry of the near infrared by the spectrum photometry, the Sn layer surface having a predetermined rough arithmetic mean roughness has a reflective index of around 60% to 80%, which is lower than the copper alloy surface having a reflective index of greater than or equal to 90%. In this manner, as the near infrared laser light is irradiated on a region where the white metal layer having a high absorbency of the near infrared laser light is formed, the white metal layer such as Sn layers having a low melting point rapidly melts and forms a molten pool, and thereby the absorptivity of the laser light further increases. As the molten pool region absorbs laser light and melts the butted portion 78, the welding of the butted portion progresses.

Note that in a case where energy of the fiber laser light L is too high or in a case where an energy density is low, the heat-affected zone (HAZ) is formed in an unnecessarily wide range, and in an extreme case, an entirety of the base material of the tubular crimp portion 30 softens. Therefore, it is preferable that the fiber laser light L welds with a power of 100 W to 500 W. Also, by adjusting the sweep rate, the weld portion 50 is provided in an appropriate range.

Also, after the welding that formed the tubular crimp portion, a lapped portion of the end portion on the transition portion 76 side of the tubular crimp portion (an end portion opposite to the insertion opening portion) is sealed by welding. The sealing is carried out in the direction perpendicular to the longitudinal direction of the terminal. The welding welds a portion where a metal member is folded and lapped from above the folded and lapped portion. With such a sealing, the end portion of the transition portion side of the tubular crimp portion is closed.

As has been described above, the method of manufacturing the terminal of the present disclosure includes punching a plate material of a metal member into a spread-out shape of a terminal, forming a terminal having a tubular body by pressing, welding a butted portion of the tubular body, and welding a lapped portion at an end portion opposite to an insertion opening portion of the tubular body to form a tubular crimp portion of a closed tubular body. In addition to the method described above, the terminal may be manufactured by methods described below.

For example, the method of manufacturing the terminal of the present disclosure may include punching a plate material of a metal member including a base material and a white metal layer only into a spread-out shape of a terminal, forming a terminal having a tubular body by pressing, providing an oil film on the white metal layer provided at a part where welding is applied, welding a butted portion of the tubular body, and welding a lapped portion at an end portion opposite to an insertion opening portion of the tubular crimp portion to form a tubular crimp portion of a closed tubular body, in this order.

With such a manufacturing method, a predetermined oil film is provided on at least a part where laser light is irradiated immediately before the welding of the metal member. By manufacturing in such a manner, the oil film may be provided at the minimum portions required.

Also, in another example, the method of manufacturing the terminal of the present disclosure may include punching a plate material of a metal member including a base material and a white metal layer only into a spread-out shape of a terminal, while forming a terminal having a tubular body by pressing, providing an oil film on the white metal layer provided at a part where welding is applied, welding a butted portion of the tubular body, and welding a lapped portion at an end portion opposite to an insertion opening portion of the tubular crimp portion to form a tubular crimp portion of a closed tubular body, in this order.

With such a manufacturing method, while pressing the metal member including a base material and a white metal layer only, a predetermined oil film is provided at a portion where at least laser light is irradiated. By manufacturing in such a manner, process steps may be simplified and the oil film may be provided at least points required.

(Wire Connecting Structure)

FIG. 7 shows a wire connecting structure 100 of the present disclosure. The wire connecting structure 100 has a structure in which the terminal 10 of the present disclosure and an electric wire 60 are crimped and joined. In the wire connecting structure 100, the electric wire 60 is crimp connected in the tubular crimp portion 30 with the electric wire 60 (a part of the electric wire conductor portions and a part of the insulating coating portion) being inserted in the tubular crimp portion 30 and the tubular crimp portion 30 being crimped. Note that the electric wire 60 includes an insulating coating portion 61 and a conductor portion, not shown. The conductor portion is composed of copper, a copper alloy, aluminum or an aluminum alloy, or the like. As has been described above, recently, a conductor portion made of an aluminum alloy is becoming popular for the purpose of reducing weight. The insulating coating portion may be, for example, those based on polyolefin such as polyethylene (PE) and polypropylene (PP) or those based on polyvinyl chloride (PVC).

At the tubular crimp portion 30, by crimping the tubular crimp portion 30 with an electric wire end portion at which a conductor is exposed being inserted into the insertion opening portion 31, the coating crimp portion 32, the reduced-diameter portion 33 and the conductor crimp portion 34 deform plastically and crimped with a part of the insulating coating portion of the electric wire 60 and a part of the conductor portion, and the tubular crimp portion 30 and the conductor portion of the electric wire 60 are thereby electrically connected. A recessed portion 35 may be formed at a part of the conductor crimp portion 34 by pressing strongly. With such a strong pressing that causes a large deformation of the part, the conductor portion of the electric wire 60 does not need to keep an original strand shape.

A wire harness can be obtained by preparing one or a plurality of such a wire connecting structure 100 and arranging a connector portion/connector portions of the wire connecting structure/wire connecting structures 100 in a housing casing.

For example, FIG. 7 shows a state where the terminal 10 is crimped with the electric wire 60. However, as shown in FIG. 8, before being crimped with an electric wire, a terminal 80 may have a stepped configuration in the tubular crimp portion. Specifically, a tubular crimp portion 81 is a tubular member that is closed at a transition portion 40 side and that may include a coating crimp portion 83 that is crimped with an insulation coating of an electric wire, not shown, a reduced-diameter portion 84 having a diameter that reduces from an insertion opening portion 82 side to a transition portion 20 side, a conductor crimp portion 85 that is crimped with a conductor of electric wire 3, a reduced-diameter portion 86 having a diameter that further reduces from the insertion opening portion 82 side to the transition portion 40 side and an end portion closed by welding.

With such a tubular crimp portion 81 having a stepped shape, when the coating of the end portion of the electric wire is removed and the end portion is inserted into the tubular crimp portion 81, the insulation coating of the electric wire is engaged with the reduced-diameter portion 84, and thereby the insulation coating is located immediately under the coating crimp portion 83 and the electric wire is located immediately under the conductor crimp portion 85. Therefore, since the positioning of the electric wire end portion can be performed easily, crimping of the coating crimp portion 83 and the insulation coating and crimping of the conductor crimp portion 85 and the conductor can be performed positively. Thus both a good water-stop capability and an electric connection can be achieved and a good tight contact ability is achieved.

The terminal shown in FIG. 4 is a female terminal having a box-shaped connector portion 20, but it is not limited thereto and the connector portion may be a male terminal. Specifically, it may be a terminal 90 shown in FIG. 9 and may be provided with a tubular crimp portion 91 crimped with an electric wire, not shown, and a connector portion 93 provided integrally with the tubular crimp portion via a transition portion 92 and electrically connected to an external terminal, not shown. The connector portion 93 has an elongated connecting portion 93a and, with the connecting portion being inserted along a longitudinal direction of the female terminal, not shown, which is an external terminal, it is electrically connected with the female terminal.

EXAMPLES

Hereinafter, the present disclosure will be described in further detail based on examples, but the present disclosure is not limited thereto.

Example

As a base material of the terminal, a copper alloy FAS-680 (product name) (strip, thickness 0.25 mm, H material) manufactured by Furukawa Electric Co., Ltd. was used. FAS-680 is a Corson (Ni—Si) copper alloy.

On this base material, a tin plating process or a nickel plating process was applied using a Sn plating bath and a Ni plating bath, which are commercially available, at a predetermined high current density (Sn plating: 5 A/dm$^2$ to 10 A/dm$^2$, Ni plating: 20 A/dm$^2$ to 30 A/dm$^2$) and with a stirring condition of 500 rpm. With such a plating process, on a surface of a portion to be laser welded, i.e., a region that becomes a tube spread-out portion, a Sn plating layer or a Ni plating layer (hereinafter referred to as a "plating layer") was provided as a white metal layer while changing the thickness of the white metal layer comprising a Sn plating layer and a Ni plating layer (hereinafter referred to as a "plating thickness") and the arithmetic mean roughness Ra of a surface as indicated in Table 1-1. The thickness of the white metal layer and the surface arithmetic mean roughness Ra were changed by varying a current density or a stirring condition. Thereafter, an oil film (G-6316F manufactured by Nihon Kosakuyu Co., Ltd.) having an electric double-layer capacitance as shown in Table 1-1 was provided on an entire surface to provide a plate material of a metal member. The plate material of the metal member was punched by a pressing process into a state where spread-out shapes of terminals are aligned.

Thereafter, a three-dimensional shaping into a shape of a terminal having a connector portion, a transition portion and a tubular body for a crimp portion was performed by a secondary press. At this time, a butted portion where the end surfaces were butted with each other was formed into a tubular body for a crimp portion. Subsequently, a length of 10 mm was joined by penetration welding by laser welding in which a near infrared laser light is irradiated on both sides of the butted portion the along the butted portion, a tubular crimp portion was manufactured.

Comparative Examples

Tubular crimp portions were formed using Sample Nos. 1 to 3 of Comparative Examples that are similar to Sample Nos. 1 to 3 of Example except that an oil film was not provided and a thickness of a Sn plating layer was changed to 0.005 μm. Tubular crimp portions were formed using Sample Nos. 4 and 5 of Comparative Examples that are similar to Sample Nos. 13 to 18 of Example except that an oil film was not provided and an arithmetic mean roughness Ra of the Sn plating layer surface was changed as shown in Table 1-2. Tubular crimp portions were formed Sample Nos. 6 to 8 of Comparative Examples that are similar to Sample Nos. 1 to 3 of Example except that an oil film was not provided and a thickness of the Sn plating layer was changed to 2 μm. Tubular crimp portions were formed using Sample Nos. 9 to 11 of Comparative Examples that are similar to Sample Nos. 1 to 3 of Example except that the thickness of the Sn plating layer was changed into 0.005 μm and an electric double-layer capacitance of the oil film was changed as indicated in Table 1-2. Tubular crimp portions were formed using Sample Nos. 12 and 13 of Comparative Examples that are similar to Sample Nos. 13 to 18 of Example except that the arithmetic mean roughness Ra of the Sn plating layer surface was changed as shown in Table 1-2 and an electric double-layer capacitance of the oil film was changed as shown in Table 1-2. Tubular crimp portions were formed using sample Nos. 14 to 16 of Comparative Examples that are similar to Sample Nos. 1 to 3 of Example except that the thickness of the Sn plating layer is changed to 2 μm and the double-layer capacitance of the oil film was changed as shown in Table 1-2. Tubular crimp portions were formed using Sample Nos. 17 to 18 of Comparative Example that are similar to Sample No. 14 of Example except that the electric double-layer capacitance of the oil film was changed as shown in Table 1-2.

Experiment conditions are as follows.

[Sn Plating Condition]

Plating solution: $SnSO_4$ 80 g/l, $H_2SO_4$ 80 g/l

Plating condition: current density 5 A/dm$^2$ to 10 A/dm$^2$, temperature 30° C.

Processing time: After setting the current density, adjusted to obtain a desired thickness of Sn plating layer.

[Ni Plating Condition]

Plating solution: $Ni(SO_3NH_2)_2 \cdot 4H_2O$ 500 g/l, $NiCl_2$ 30 g/l, $H_3BO_3$ 30 g/l Plating Condition: current density 20 A/dm$^2$ to 30 A/dm$^2$, temperature 50° C.

Processing time: After setting the current density, adjusted to obtain a desired thickness of Ni plating layer.

Within the aforementioned conditions, after setting the current density such that the arithmetic mean roughness Ra on the surface of plating layer changes, a processing time was changed to obtain ten samples that are within ±10% of a desired thickness for each thickness level. Note that the thickness of the plating layer is measured with a fluorescent X-rays film thickness meter by measuring an average thickness of the layer on the end portion.

The laser welding conditions are as follows.

(1) Laser welding apparatus: single-mode fiber laser manufactured by Furukawa Electric Co., Ltd. ASF1J221 (product name) (500 W, CW fiber laser)

Light source of the laser light: Yb doped glass fiber laser generator

Laser light emission wavelength: 1084±5 nm

Laser light maximum power: 500 W (2) Laser irradiation condition

Laser light power: 400 W (continuous emission):

Laser light sweep rate: 135 mm/sec

Laser light sweep distance: 10 mm

Laser light irradiation with all conditions focused (spot diameter size: 20 μm)

Each sample was obtained by changing various conditions as shown in Table 1-2. The obtained samples were tested and evaluated for laser weldability as follows. The laser weldability was evaluated by the number of the blowholes and a width of HAZ. The number of blowholes is used as an index of weld flaws. The less the number of blowholes which occurred after the welding, the better the weldability. The narrower width of HAZ implies that an area in which the material strength has decreased will be narrow, and as a result, it becomes less likely to produce a stress concentration and a crack as a result.

After laser welding, a transmission X-ray image of the laser welded portion was imaged and the number of blowholes was counted. The number of blowholes of 10 samples produced experimentally under the same condition was measured and an average value was taken and a value obtained by rounding off a decimal and taking a unit digit as a significant figure was adopted. Since the roughness of the weld portion surface and the weld internal defect increase when the number of the blowhole exceeds ten, it is taken as a threshold, and evaluation is performed such that "⊚ (very good)" for a case where the number of blowholes produced is from 0 to less than 10, "○ (good)" for a case of greater than or equal to 10 and less than 20, "Δ (acceptable)" for a case of greater than or equal to 20 and less than 30, and "× (bad)" for a case greater than or equal to this.

After the laser welding, a cross section of the weld portion was exposed at a cross section perpendicular to a longitudinal direction, and a width of the HAZ was actually measured. Since the heat-affected zone (HAZ) is a portion of a hardness of less than or equal to 80% of the hardness of the base material, a value of the hardness of the base material is measured in advance. The hardness of the base material is an average value after a ten-point measurement. In order to measure the width of the HAZ, at first, a border between the weld portion and the heat-affected zone (HAZ) is clarified. Then, a line dividing a thickness of the base material in half is drawn and hardness is measured using a nanoindenter every 5 μm with an intersection point of the weld portion and the border of the heat-affected zone (HAZ) being taken as a start point. Then, measurement is carried out until it comes to a point where a value exceeds 80% of the value of the hardness of the previously measured base material. A distance from the start point to such a point was taken as a width of the HAZ at one side. Such a measurement was performed in the heat-affected zone (HAZ) on either side of the weld portion and an average value was taken and used as a HAZ of the present disclosure. Since a crack or the like is likely to occur at the time of the processing when a width of the HAZ exceeded 100 μm, it is taken as a threshold, and evaluation is performed such that "⊚ (very good)" for a case where the width of HAZ produced is less than 80 μm, "○ (good)" for a case of greater than or equal to 80 μm and less than 100 μm, and "× (bad)" for a case greater than 100 μm.

The results are shown in Tables 1-1 and 1-2.

TABLE 1-1

| | | CONDITION | | | | EVALUATION | | | |
| | | WHITE METAL LAYER PLATING | | | OIL FILM ELECTRIC DOUBLE-LAYER | LASER WELDABILITY | | | |
| | | | | | | BLOWHOLE | | HAZ | |
| | SAMPLE No. | TYPE | THICKNESS (μm) | Ra (μm) | CAPACITANCE (μF/cm$^2$) | NUMBER OF BLOWHOLES | EVALUATION | WIDTH (μm) | EVALUATION |
|---|---|---|---|---|---|---|---|---|---|
| EXAMPLE | 1 | Sn | 0.01 | 0.6 | 2.6 | 15 | ○ | 5 | ⊚ |
| | 2 | | | 0.8 | 2.1 | 12 | ○ | 10 | ⊚ |
| | 3 | | | 1.2 | 2.0 | 10 | ○ | 15 | ⊚ |
| | 4 | | | 0.6 | 5.0 | 26 | Δ | 20 | ⊚ |
| | 5 | | | 0.8 | 4.8 | 23 | Δ | 25 | ⊚ |
| | 6 | | | 1.2 | 3.4 | 20 | Δ | 30 | ⊚ |
| | 7 | | 0.1 | 0.6 | 2.1 | 5 | ⊚ | 25 | ⊚ |
| | 8 | | | 0.8 | 2.5 | 3 | ⊚ | 30 | ⊚ |
| | 9 | | | 1.2 | 2.5 | 1 | ⊚ | 35 | ⊚ |
| | 10 | | | 0.6 | 4.5 | 17 | ○ | 40 | ⊚ |
| | 11 | | | 0.8 | 3.3 | 15 | ○ | 45 | ⊚ |
| | 12 | | | 1.2 | 4.8 | 13 | ○ | 50 | ⊚ |
| | 13 | | 0.4 | 0.6 | 2.0 | 2 | ⊚ | 55 | ⊚ |
| | 14 | | | 0.8 | 2.1 | 1 | ⊚ | 60 | ⊚ |
| | 15 | | | 1.2 | 2.4 | 0 | ⊚ | 65 | ⊚ |
| | 16 | | | 0.6 | 5.0 | 12 | ○ | 70 | ⊚ |
| | 17 | | | 0.8 | 3.2 | 11 | ○ | 75 | ⊚ |
| | 18 | | | 1.2 | 3.3 | 10 | ○ | 80 | ⊚ |
| | 19 | | 0.8 | 0.6 | 2.1 | 2 | ⊚ | 75 | ⊚ |
| | 20 | | | 0.8 | 2.0 | 0 | ⊚ | 80 | ⊚ |
| | 21 | | | 1.2 | 2.6 | 0 | ⊚ | 85 | ⊚ |
| | 22 | | | 0.6 | 4.8 | 12 | ○ | 90 | ○ |
| | 23 | | | 0.8 | 5.0 | 10 | ○ | 95 | ○ |
| | 24 | | | 1.2 | 3.4 | 10 | ○ | 100 | ○ |
| | 25 | Ni | 0.01 | 0.8 | 2.0 | 13 | ○ | 15 | ⊚ |
| | 26 | | | 0.8 | 3.1 | 24 | Δ | 30 | ⊚ |
| | 27 | | 0.1 | 0.8 | 2.5 | 4 | ⊚ | 35 | ⊚ |
| | 28 | | | 0.8 | 5.0 | 14 | ○ | 50 | ⊚ |
| | 29 | | 0.4 | 0.8 | 2.0 | 3 | ⊚ | 65 | ⊚ |
| | 30 | | | 0.8 | 4.5 | 13 | ○ | 80 | ⊚ |
| | 31 | | 0.8 | 0.8 | 2.0 | 1 | ⊚ | 85 | ⊚ |
| | 32 | | | 0.8 | 3.3 | 11 | ○ | 100 | ○ |

TABLE 1-2

| | | CONDITION | | | EVALUATION LASER WELDABILITY | | | |
|---|---|---|---|---|---|---|---|---|
| | | WHITE METAL LAYER | | OIL FILM ELECTRIC DOUBLE-LAYER CAPACITANCE ($\mu F/cm^2$) | BLOWHOLE | | HAZ | |
| SAMPLE No. | TYPE | PLATING THICKNESS ($\mu m$) | Ra ($\mu m$) | | NUMBER OF BLOWHOLES | EVALUATION | WIDTH ($\mu m$) | EVALUATION |
| COMPARATIVE EXAMPLE 1 | Sn | 0.005 | 0.6 | N/A | 52 | X | 20 | ⊚ |
| 2 | | | 0.8 | | 44 | X | 25 | ⊚ |
| 3 | | | 1.2 | | 40 | X | 30 | ⊚ |
| 4 | | 0.4 | 0.2 | | 39 | X | 65 | ⊚ |
| 5 | | | 1.6 | | 18 | ○ | 110 | X |
| 6 | | 2 | 0.6 | | 22 | Δ | 125 | X |
| 7 | | | 0.8 | | 21 | Δ | 135 | X |
| 8 | | | 1.2 | | 21 | Δ | 145 | X |
| 9 | | 0.005 | 0.6 | 2.1 | 41 | X | 15 | ⊚ |
| 10 | | | 0.8 | 2.0 | 36 | X | 20 | ⊚ |
| 11 | | | 1.2 | 2.5 | 32 | X | 25 | ⊚ |
| 12 | | 0.4 | 0.2 | 2.1 | 30 | X | 60 | ⊚ |
| 13 | | | 1.6 | 2.1 | 8 | ⊚ | 105 | X |
| 14 | | 2 | 0.6 | 2.0 | 11 | ○ | 120 | X |
| 15 | | | 0.8 | 2.4 | 11 | ○ | 130 | X |
| 16 | | | 1.2 | 2.1 | 10 | ○ | 140 | X |
| 17 | | 0.4 | 0.8 | 10.0 | 35 | X | 75 | ⊚ |
| 18 | | | 0.8 | 1.4 | 5 | ⊚ | 105 | X |

As can be seen from results of Tables 1-1 and 1-2, each sample of the examples had a good laser weldability. Particularly, the results show that those having a reduced plating thickness, i.e., a reduced thickness of the white metal layer had improved effects in reducing the width of the HAZ. On the other hand, with Sample Nos. 1 to 3 and Nos. 9 to 11 of Comparative Examples, the thickness of the Sn plating layer was 0.005 μm, and, the results show that there are a large number of blowholes. Further, with Sample No. 4 and No. 12 of Comparative Examples, an arithmetic mean roughness Ra of the Sn plating layer surface was 0.2 μm, and the results show that the laser weldability is low. Further, with Sample Nos. 5 and 13 of Comparative Examples, the arithmetic mean roughness Ra of the Sn plating layer surface was 1.6 μm, and the results show that the width of HAZ is wide. Further, with Sample Nos. 6 to 8 and Nos. 14 to 16 of Comparative Examples, the thickness of the Sn plating layer was 2 μm, and the results show that the width of the HAZ is wide. Particularly, with Sample Nos. 1 to 8 of Comparative Examples, since an oil film was not formed, it was found that the laser weldability is low. Further, with No. 17 of the comparative example, an electric double-layer capacitance of the oil film was 10.0 μF/cm², and there are a large number of blowholes. Further, with No. 18 of Comparative Example, an electric double-layer capacitance of the oil film was 1.4 μF/cm², and the results show that the width of HAZ is wide. From the above, the metal member of the present disclosure has an improved laser weldability with the thickness of the white metal layer being 0.01 μm to 0.80 μm, the arithmetic mean roughness of the surface of the white metal layer being 0.6 μm to 1.2 μm, and the electric double-layer capacitance of the oil film being 1.5 μF/cm² to 7.0 μF/cm².

Further, results similar to Examples can be obtained by using a copper alloy FAS-820 (product name) manufactured by Furukawa Electric Co., Ltd. and copper alloys MAX251 and MAX-375 (product names, respectively) manufactured by Mitsubishi Shindoh Co., Ltd. instead of a copper alloy (FAS-680).

What is claimed is:

1. A metal member comprising:
   a base material composed of one of copper and a copper alloy;
   a white metal layer provided on the base material at a part or an entirety thereof; and
   an oil film provided on the white metal layer,
   the white metal layer having a thickness in a range of 0.01 μm to 0.80 μm,
   a surface of the white metal layer having an arithmetic mean roughness in a range of 0.6 μm to 1.2 μm,
   the oil film having an electric double-layer capacitance in a range of 1.5 μF/cm² to 7.0 μF/cm².

2. The metal member according to claim 1, wherein the white metal layer comprises at least one layer selected from a group consisting of an Sn layer, an Sn alloy layer, an Ni layer, and an Ni alloy layer.

3. A terminal formed from the metal member according to claim 1, the terminal comprising:
   a connector portion adapted to mate with another terminal;
   a tubular crimp portion adapted to securely crimp onto a wire; and
   a transition portion that links the connector portion and the tubular crimp portion,
   the tubular crimp portion being formed as a tubular body having a closed end.

4. A wire connecting structure formed by joining the terminal of claim 3 and a coated wire, wherein the tubular crimped portion is crimped onto the coated wire.

5. The wire connecting structure according to claim 4, wherein a conductor portion of the coated wire is composed of one of aluminum and an aluminum alloy.

6. A method of manufacturing a terminal, comprising:
   punching a metal member to form a cut-out section, the metal member comprising a plate, a white metal layer, and an oil film, the plate being of a base material composed of one of copper and a copper alloy, the white metal layer being at least partially provided on the plate, the oil film being provided on the white metal layer, the white metal layer having a thickness in a range of 0.01 μm to 0.80 μm, a surface of the white metal layer having an arithmetic mean roughness in a range of 0.6 μm to 1.2 μm, the oil film having an electric double-layer capacitance in a range of 1.5 μF/cm² to 7.0 μF/cm²;

bending the cut-out section to form a tubular body, the tubular body having a butted portion, a lapped portion, and an insertion opening portion;

welding the butted portion of the tubular body, the white metal layer on the plate being at least where the butted portion is welded; and welding the lapped portion at an end portion of the tubular body that is opposite to the insertion opening portion to form a tubular crimp portion, the white metal layer on the plate being at least where the lapped portion is welded.

7. The method of manufacturing a terminal according to claim 6, wherein the white metal layer is at least one layer selected from a group consisting of a Sn layer, a Sn alloy layer, a Ni layer and a Ni alloy layer.

8. The method of manufacturing a terminal according to claim 6, wherein the welding is performed by a fiber laser.

9. A method of manufacturing a terminal, comprising:

punching a metal member to form a cut-out section, the metal member comprising a plate being of a base material composed of one of copper and a copper alloy, and a white metal layer at least partially provided on the plate, the white metal layer having a thickness in a range of 0.01 μm to 0.80 μm, a surface of the white metal layer having an arithmetic mean roughness in a range of 0.6 μm to 1.2 μm;

bending the cut-out section to form a tubular body, the tubular body having a butted portion, a lapped portion, and an insertion opening portion;

providing an oil film on the white metal layer, the oil film having an electric double-layer capacitance in a range of 1.5 μF/cm² to 7.0 μF/cm²;

welding the butted portion of the tubular body, the white metal layer on the plate being at least where the butted portion is welded; and welding the lapped portion at an end portion of the tubular body opposite to the insertion opening portion to form a tubular crimp portion, the white metal layer on the plate being at least where the lapped portion is welded.

10. The method of manufacturing a terminal according to claim 9, wherein the white metal layer is at least one layer selected from a group consisting of a Sn layer, a Sn alloy layer, a Ni layer, and a Ni alloy layer.

11. The method of manufacturing a terminal according to claim 9 wherein the welding is performed by a fiber laser.

12. A method of manufacturing a terminal, comprising:

punching a metal member to form a cut-out section, the metal member comprising a plate being of a base material composed of one of copper and a copper alloy, and a white metal layer at least partially provided on the plate, the white metal layer having a thickness in a range of 0.01 μm to 0.80 μm, a surface of the white metal layer having an arithmetic mean roughness in a range of 0.6 μm to 1.2 μm;

providing an oil film on the white metal layer while bending the cut-out section to form a tubular body, the oil film having an electric double-layer capacitance in a range of 1.5 μF/cm² to 7.0 μF/cm², the tubular body having a butted portion, a lapped portion, and an insertion opening portion;

welding the butted portion of the tubular body, the white metal layer on the plate being at least where the butted portion is welded; and welding the lapped portion at an end portion of the tubular body opposite to the insertion opening portion to form a tubular crimp portion, the white metal layer on the plate being at least where the lapped portion is welded.

13. The method of manufacturing a terminal according to claim 12, wherein the white metal layer is at least one layer selected from a group consisting of a Sn layer, a Sn alloy layer, a Ni layer, and a Ni alloy layer.

14. The method of manufacturing a terminal according to claim 12, wherein the welding is performed by a fiber laser.

* * * * *